United States Patent
Inlow et al.

(10) Patent No.: US 9,124,719 B2
(45) Date of Patent: *Sep. 1, 2015

(54) DEVICES, SYSTEMS AND METHODS FOR MANAGING CUSTOM ALPHA TAGS

(71) Applicant: AT&T Mobility II LLC, Atlanta, GA (US)

(72) Inventors: Scott Inlow, Lawrenceville, GA (US); James Allan Payne, Woodstock, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,245

(22) Filed: Oct. 27, 2014

(65) Prior Publication Data

US 2015/0044991 A1 Feb. 12, 2015

Related U.S. Application Data

(63) Continuation of application No. 14/170,005, filed on Jan. 31, 2014, now Pat. No. 8,874,098, which is a continuation of application No. 12/578,011, filed on Oct. 13, 2009, now Pat. No. 8,666,381.

(51) Int. Cl.
*H04M 3/00* (2006.01)
*H04M 1/725* (2006.01)
*H04M 3/42* (2006.01)
(Continued)

(52) U.S. Cl.
CPC ......... *H04M 1/72563* (2013.01); *G06F 3/0484* (2013.01); *H04M 3/42153* (2013.01); *H04M 3/42178* (2013.01); *H04M 15/00* (2013.01); *H04M 15/06* (2013.01); *H04M 15/51* (2013.01); *H04M 15/72* (2013.01); *H04W 8/02* (2013.01); *H04W 8/18* (2013.01); *H04W 84/042* (2013.01)

(58) Field of Classification Search
USPC ............ 455/418–420, 550.1, 551; 379/15.03, 379/201.01, 201.12
See application file for complete search history.

(56) References Cited

U.S. PATENT DOCUMENTS 5,835,858 A * 11/1998 Vaihoja et al. ................ 455/419
5,903,832 A * 5/1999 Seppanen et al. .......... 455/435.3
(Continued)

OTHER PUBLICATIONS

U.S. Office Action dated Jan. 30, 2012 in U.S. Appl. No. 12/578,011.
(Continued)

*Primary Examiner* — Mehmood B Khan
(74) *Attorney, Agent, or Firm* — Hartman & Citrin LLC

(57) ABSTRACT

Devices, systems and methods are disclosed for a subscriber of services on a network to display a custom operator name or alpha tag on the subscriber mobile communications device. The custom alpha tag (or operator name) is selected or defined by the subscriber via an interface on a communications device, and a custom operator name request is submitted to a provisioning logic on the network. The provisioning logic communicates with business rule logic on the network, the business rule logic being configured to retrieve and/or update a first account associated with the subscriber with the custom operator name. A billing logic within a billing subsystem may be invoked to debit a second account associated with the subscriber. A programming logic on the network then updates one or more mobile devices with the custom alpha tag. The several logic units may be part of an Over-the-air (OTA) platform on the network.

20 Claims, 5 Drawing Sheets

(51) Int. Cl.

| | |
|---|---|
| *H04M 15/00* | (2006.01) |
| *H04M 15/06* | (2006.01) |
| *H04W 8/18* | (2009.01) |
| *G06F 3/0484* | (2013.01) |
| *H04W 8/02* | (2009.01) |
| *H04W 84/04* | (2009.01) |

(56) References Cited

U.S. PATENT DOCUMENTS

| | | | |
|---|---|---|---|
| 5,950,130 A * | 9/1999 | Coursey | 455/432.1 |
| 6,215,994 B1 * | 4/2001 | Schmidt et al. | 455/419 |
| 6,314,283 B1 * | 11/2001 | Fielden | 455/411 |
| 6,400,948 B1 * | 6/2002 | Hardin | 455/434 |
| 6,529,491 B1 * | 3/2003 | Chang et al. | 370/335 |
| 6,625,451 B1 * | 9/2003 | La Medica et al. | 455/434 |
| 6,684,082 B1 * | 1/2004 | McClure | 455/552.1 |
| 6,810,251 B2 | 10/2004 | Hassan | |
| 7,110,751 B1 * | 9/2006 | Overby | 455/418 |
| 7,248,895 B2 * | 7/2007 | Shiraogawa et al. | 455/557 |
| 7,305,090 B1 * | 12/2007 | Hayes et al. | 380/249 |
| 7,356,338 B2 | 4/2008 | Bamburak | |
| 7,409,213 B2 | 8/2008 | Bamburak | |
| 7,818,031 B2 * | 10/2010 | Laumen et al. | 455/558 |
| 8,195,140 B2 * | 6/2012 | Knezevic | 455/418 |
| 2002/0077121 A1 * | 6/2002 | Ketola | 455/456 |
| 2002/0193125 A1 * | 12/2002 | Smith | 455/458 |
| 2003/0022689 A1 * | 1/2003 | McElwain et al. | 455/551 |
| 2003/0054809 A1 * | 3/2003 | Bridges et al. | 455/419 |
| 2003/0186695 A1 * | 10/2003 | Bridges et al. | 455/432 |
| 2003/0191823 A1 * | 10/2003 | Bansal et al. | 709/220 |
| 2004/0157599 A1 * | 8/2004 | Holcman et al. | 455/432.1 |
| 2004/0203744 A1 * | 10/2004 | Hicks et al. | 455/432.1 |
| 2004/0266433 A1 * | 12/2004 | Maillard et al. | 455/435.1 |
| 2005/0078645 A1 * | 4/2005 | Hamadi et al. | 370/338 |
| 2005/0107083 A1 * | 5/2005 | Rager et al. | 455/435.1 |
| 2005/0113089 A1 * | 5/2005 | Bamburak et al. | 455/435.2 |
| 2005/0153682 A1 * | 7/2005 | Minear et al. | 455/405 |
| 2007/0214093 A1 * | 9/2007 | Colella | 705/67 |
| 2008/0020761 A1 * | 1/2008 | Park | 455/434 |
| 2009/0036121 A1 * | 2/2009 | Bridges et al. | 455/432.1 |
| 2009/0054062 A1 | 2/2009 | Bamburak | |
| 2009/0082005 A1 * | 3/2009 | Thorson et al. | 455/422.1 |
| 2009/0092080 A1 * | 4/2009 | Balasubramanian et al. | 370/328 |

OTHER PUBLICATIONS

U.S. Office Action dated Oct. 9, 2012 in U.S. Appl. No. 12/578,011.
U.S. Notice of Allowance dated Oct. 4, 2013 in U.S. Appl. No. 12/578,011.
U.S. Notice of Allowance dated Jun. 12, 2014 in U.S. Appl. No. 14/170,005.
U.S. Notice of Allowance dated Sep. 23, 2014 in U.S. Appl. No. 14/170,005.

* cited by examiner

DEVICES, SYSTEMS AND METHODS FOR MANAGING CUSTOM ALPHA TAGS

CROSS REFERENCE TO RELATED APPLICATIONS

This application is a continuation of and claims priority to U.S. patent application Ser. No. 14/170,005, now U.S. Pat. No. 8,874,098, filed Jan. 31, 2014, entitled "Devices, Systems and Methods for Managing Custom Alpha Tags," which is a continuation of and claims priority to U.S. patent application Ser. No. 12/578,011, now U.S. Pat. No. 8,666,381, filed Oct. 13, 2009, entitled "Devices, Systems and Methods for Managing Custom Alpha Tags," wherein the contents of each are herein incorporated by reference in their entirety.

BACKGROUND OF THE INVENTION

1. Field of the Invention

The present invention relates to mobile networks. More particularly, the present invention relates to displaying customized network operator names on mobile communication devices.

2. Background of the Invention

Mobile networks are becoming ubiquitous, and mobile devices are in constant use. With so many mobile network operators building base stations/towers in more locations, a user or subscriber of a mobile service need not fear losing a connection because of lack of coverage. Improved roaming capabilities and contractual arrangements between network operators have further improved the customer experience.

However, there is still room for improvement in the way a mobile communication device indicates the network to which it is currently connected. At present, a mobile communication device displays an operator name, also known as an "alpha tag" on its home screen when it is connected to a particular network. For instance, a mobile phone connected to AT&T's network would display "AT&T" somewhere on its screen. This indicates to a subscriber that the device is enabled to use all the services provided by the AT&T network. If the subscriber travels to a location that is covered by one of AT&T's partners or affiliates, then the alpha tag could display "Partner", or if there are no extra charges involved, the phone could continue to display "AT&T." If the phone is using another network based on a roaming arrangement, the alpha tag could display "Roaming" or an equivalent message.

Although these operator names are somewhat informative, they are still limited in the information they convey. Further, given the ability for most modern devices to be customized to several fine degrees based on a subscriber or user's preferences, it is still an archaic practice to display a rigid unchangeable operator's name. To counter this, several network operators update or change the alpha tag for marketing or other purposes. However, this still does not allow a subscriber to customize an alpha tag. What is needed is a means for a subscriber to define their own operator name displayed on a device, while allowing the operator to maintain control over the customization process.

SUMMARY OF THE INVENTION

The present invention provides several means for a subscriber of services on a network to display a custom operator name or alpha tag on their mobile communications device. The custom alpha tag (or operator name) is selected or defined by the subscriber via an interface on a communications device, and a custom operator name request is submitted to a provisioning logic on the network. The provisioning logic communicates with a business rule logic on the network, the business rule logic being configured to retrieve and/or update a first account associated with the subscriber with the custom operator name. A billing logic within a billing subsystem may be invoked to debit a second account associated with the subscriber. A programming logic on the network then updates one or more mobile devices with the custom alpha tag. The several logic units may be part of an Over-the-air (OTA) platform on the network, such as an SFM server.

In one exemplary embodiment, the present invention is a system for customizing an operator name displayed on a mobile communication device on a network. The system includes a first communication device including at least a processor and a memory, a provisioning logic on the network that receives a custom operator name request from the first communication device, the custom operator name request including a custom operator name, a business rule logic on the network that updates a subscriber account associated with the custom operator name request, and a programming logic on the network that transmits a custom operator name to a mobile communication device on the network, wherein the mobile communication device is associated with the subscriber account. A smart card configured to be removably coupled to the mobile communication device, includes a database storing a plurality of rules associated with a plurality of operator names. The plurality of rules includes a PLMN Network Name (PNN) list, and wherein the plurality of operator names includes an Enhanced Operator Name String (EONS). Therefore, the programming logic transmits the custom operator name to the mobile communication device by updating the database with the custom operator name. A user of the device may be provided with plurality of predefined operator names to choose from, and an option to generate the custom operator name.

In another exemplary embodiment, the present invention is a method for customizing an operator name displayed on a mobile communication device on a network. The method includes receiving a custom operator name request from a first communication device across a network, the custom operator name request including a unique subscriber ID and a custom operator name, provisioning a first subscriber account associated with the unique subscriber ID with the custom operator name, and transmitting the custom operator name to a mobile communication device on the network, the mobile communication device being associated with the first subscriber account and having a smart card storing a database, the database including a plurality of rules associated with a plurality of operator names. The method further includes updating a plurality of databases on a corresponding plurality of mobile devices associated with the subscriber account. The method further includes charging a second subscriber account associated with the unique subscriber ID in response to the custom operator name request.

In yet another exemplary embodiment, the present invention is a method for customizing an operator name displayed on a mobile communication device on a network from a subscriber's point of view. The method includes generating a custom operator name request at a first communication device on a network, the custom operator name request including a unique subscriber ID and a custom operator name, transmitting the custom operator name request to an over-the-air (OTA) platform on the network, receiving the custom operator name at a mobile communication device associated with the unique subscriber ID, the mobile communication device having a smart card storing a database, the database including a plurality of rules associated with a plurality of operator names, and populating the database with the custom operator name. The custom operator name is displayed on a screen of the mobile communication device when the mobile communication device is connected to a specified network.

DETAILED DESCRIPTION OF THE INVENTION

Figure 1:
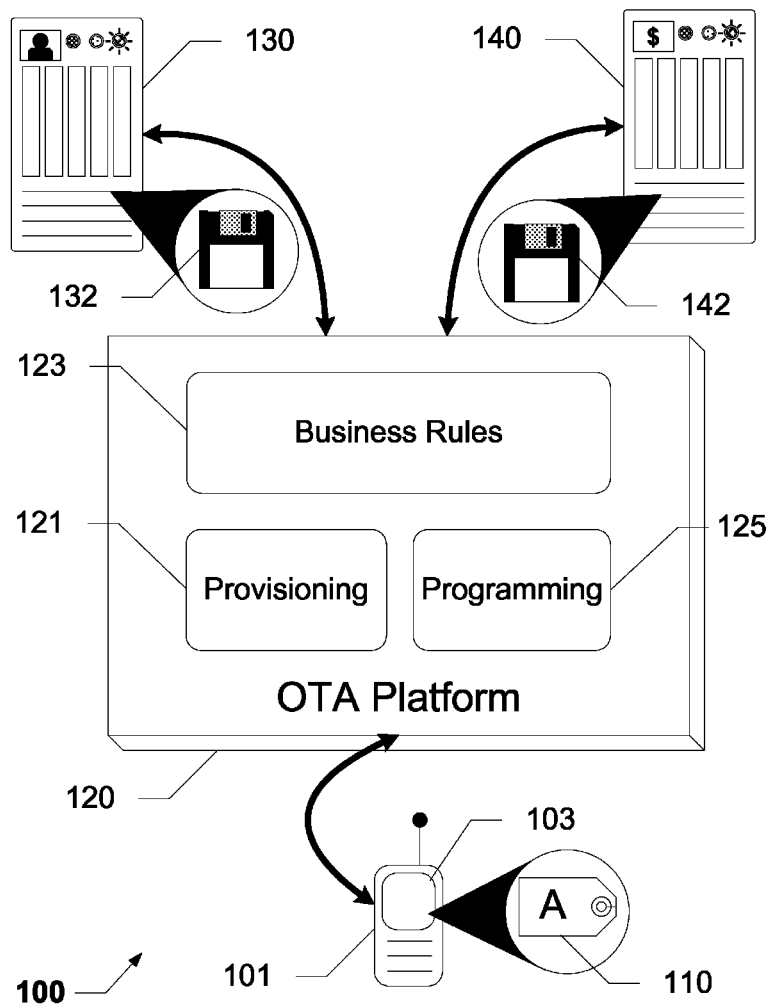
FIG. 1 shows a system for displaying a custom operator name, according to an exemplary embodiment of the present invention.

The following detailed description presents systems and methods for displaying a custom alpha tag on a subscriber's mobile device. The custom alpha tag (or operator name) is selected or defined by the subscriber via an interface on a communications device, and a custom operator name request is submitted to a provisioning logic on the network. The provisioning logic communicates with a business rule logic on the network, the business rule logic being configured to retrieve and/or update a first account associated with the subscriber with the custom operator name. A billing logic within a billing subsystem may be invoked to debit a second account associated with the subscriber. A programming logic on the network then updates one or more mobile devices with the custom alpha tag. The several logic units may be part of an Over-the-air (OTA) platform on the network.

"Communications device", as used herein and throughout this disclosure, refers to any device capable of sending and receiving data across a network. Examples of a handheld communications device include cellular telephones, personal digital assistants (PDAs), laptop computers, portable music devices having transceivers, etc. Communication devices typically have, inter alia, a memory and a processor. The memory stores applications, software, or "logic" in the form of a computer program readable by the processor. "Logic", as used herein and throughout this disclosure, refers to any information having the form of instruction signals and/or data that may be applied to affect the operation of a processor. Examples of processors are computer processors (processing units), microprocessors, digital signal processors, controllers and microcontrollers, etc. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS (electrically erasable programmable read-only memories). Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Communication devices communicate with each other and with other elements via a communication network, for instance, a wireless network, or a wireline network. Networks can include broadband wide-area networks or local-area networks. Communication across a network is preferably packet-based, however, radio and frequency/amplitude modulations networks can enable communication between communication devices using appropriate analog-digital-analog converters and other elements. A network typically includes a plurality of servers that host logic for performing tasks on the network. In modern packet-based wide-area networks, servers may be placed at several logical points on the network. An example of a server is an Application Server that hosts an application for remote communication devices to access via the network. Application servers may be in communication with databases and can enable communication devices to access the contents of a database. Other examples of servers include but are not limited to proxy and authentication servers, billing servers, etc.

"Smart card", as used herein and throughout this disclosure, refers to a card with integrated circuits and including a memory and a processor and may be read by an electronic device. Smart cards are similar to memory cards in that they have a memory and can be read by electronic devices. However, smart cards differ in that they include a processor. Smart cards are often equipped with logic to require authentication before revealing the contents of its memory. Examples of smart cards include Integrated Circuit Cards (ICC), Universal ICCs (UICC), Subscriber Identity Module (SIM) cards, etc., and combinations thereof.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system 100 for displaying a custom alpha tag, according to an exemplary embodiment of the present invention. System 100 includes a communication device 101, which can communicate with a plurality of logic units, such as provisioning logic 121, business rules logic 123, and programming logic 125, over a network. Logic units 121, 123, and 125 may be part of an over-the-air (OTA) platform. System 100 further includes an account management system 130 which includes a first subscriber account 132, and a billing system 140 which includes billing logic in communication with a second subscriber account 142.

In the present embodiment, communication device 101 is a mobile communication device such as a wireless terminal; however, in other embodiments, device 101 can include any of the communication devices defined above. Communication device 101 includes a screen 103 which displays an operator name 110 when communication device 101 is connected to the network. Communication device 101 is described in more detail in FIG. 2. Provisioning logic 121 provides a means for a subscriber to update or configure services associated with the subscriber's account 132 via account management system 130. Provisioning logic may be part of an application server within the OTA platform. In such a case, a subscriber would use an application on device 101 or a web-based application to customize their account services.

In this embodiment, provisioning logic 121 provides an interface for a subscriber to customize the alpha tag 110 displayed on screen 103.

Business rules logic 123 is another logic unit that is part of a business rules engine within OTA platform 120. Business rules logic 123 receives requests to customize a subscriber account via provisioning logic 121, and processes the requests by retrieving information from and/or updating subscriber accounts 132 and 142. Business rules logic 123 may further be in communication with a rule database configured by an operator of the network. Programming logic 125 is configured to program new services or to remove unwanted services by directly modifying information stored on a memory on device 101. In this embodiment, programming logic 125 modifies device 101 to display a custom alpha tag 110 as described herein.

Account management system 130 is a server or plurality of servers configured to add, remove, and modify the services provisioned to a subscriber's account 132. Account management system 130 receives provisioning instructions from provisioning logic 121 and business rules logic 123. Account management system 130 may be integrated within OTA platform 120, or may be logically situated at another part of an operator's network, and may be operated externally by one or more service providers. Similarly, billing system 140 is part of an external subsystem configured to store and modify billing information for a subscriber account 142. Billing logic within billing system 140 receives instructions to debit or credit account 142 when a service is provisioned or removed. All logic units/servers within system 100 communicate via a network such as mobile operator's network, and each has a unique address. Communication between network elements may occur via any packet-based system such as TCP/IP, SIP, IMS, and combinations thereof.

Figure 2:
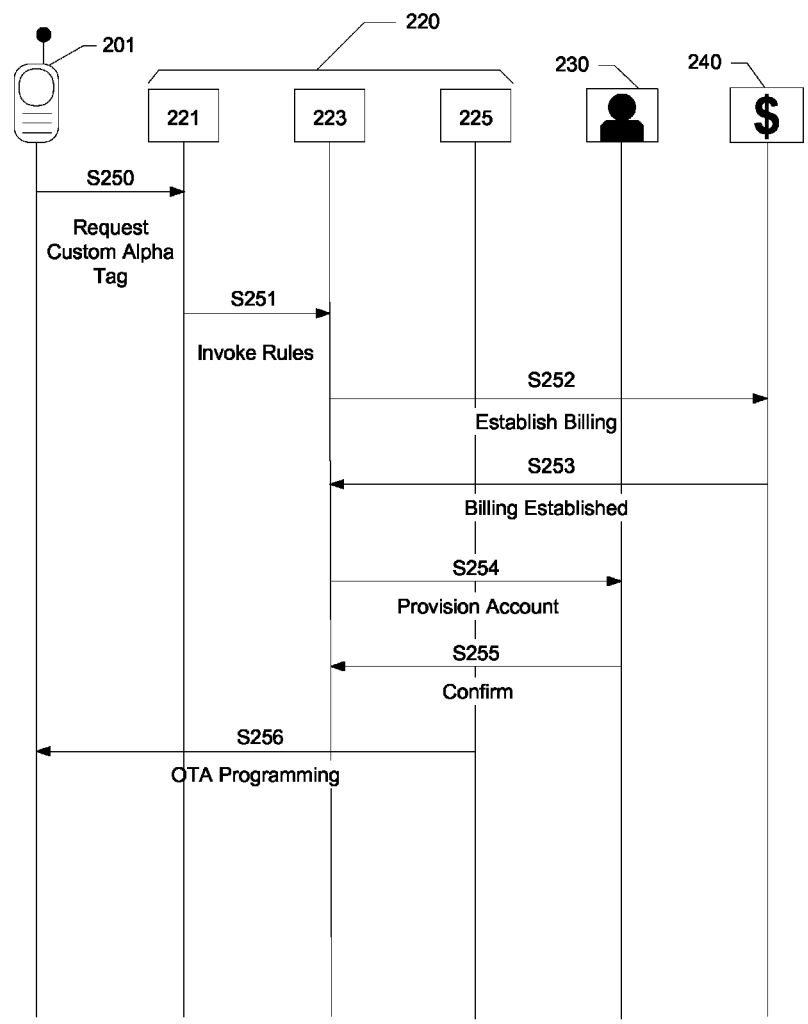
FIG. 2 shows a method for displaying a custom operator name, according to an exemplary embodiment of the present invention.

A method for customizing a network operator name is further described in the exemplary embodiment of FIG. 2. A user of device 201 requests a custom alpha tag (S250) via an application or via a web interface provided by a provisioning logic 221 within OTA platform 220. An exemplary web interface is described in FIG. 5. The application generates a custom operator name request, which includes at least a unique ID associated with a subscriber, as well as an alphanumeric string containing the custom operator name or alpha tag.

The custom operator name request may additionally contain a plurality of custom operator names corresponding to a plurality of network IDs and/or locations, allowing a subscriber to define several alpha tags using a single request. The subscriber can further define alpha tags for sub-groups of devices owned by the subscriber, for instance, business divisions within a large corporation can display different custom alpha tags on the devices given to the employees of that division.

The custom operator name request is forwarded by provisioning logic 121 to invoke rules (S251) via business rule logic 123, which parses the custom operator name request and retrieves records for the subscriber from billing system 240 and account management system 230 using the unique ID in the request. Subscriber account 132 is checked to see whether the custom operator name within the record already exists in the account. In addition, a business rule database may be checked to determine if the custom operator name matches any existing rules. Based on the determination, business rule logic 123 invokes account management system 230 to modify or provision (S254) a subscriber's account with the new custom operator name. In one embodiment, the new custom operator name is added to an Operator Public Land Mobile Network (PLMN) list stored within the subscriber's account on the network. In addition, billing system 240 may be invoked (S252) if the subscriber is to be charged a fee for the custom operator name request. For instance, business rule logic 223 can be configured to ensure that the subscriber is authorized to change an alpha tag by retrieving the second subscriber account from billing system 240. When a custom operator name request is authorized (S253) by billing server 240 and is provisioned (S255) to the subscriber's account, programming logic 225 is invoked to enable (S256) the subscriber's device 201 to display the custom operator name or alpha tag. This is performed over-the-air, by modifying an operator name list or corresponding PLMN list stored on a smart card within device 201, such as a SIM card or a UICC. Device 201 can now display the custom alpha tag on its display whenever it is connected to the specified network.

The present invention also provides for an approval logic that compares the alphanumeric string or custom alpha tag to a set of rules defined by either the network operator or a subscriber associated with the account. These rules may be applied in addition to business rules and billing rules, and may be customized to meet the needs of the operator or subscriber. For instance, approval logic may deny a custom operator name request that is obscene, or that conflicts with an existing business rule.

Figure 3:
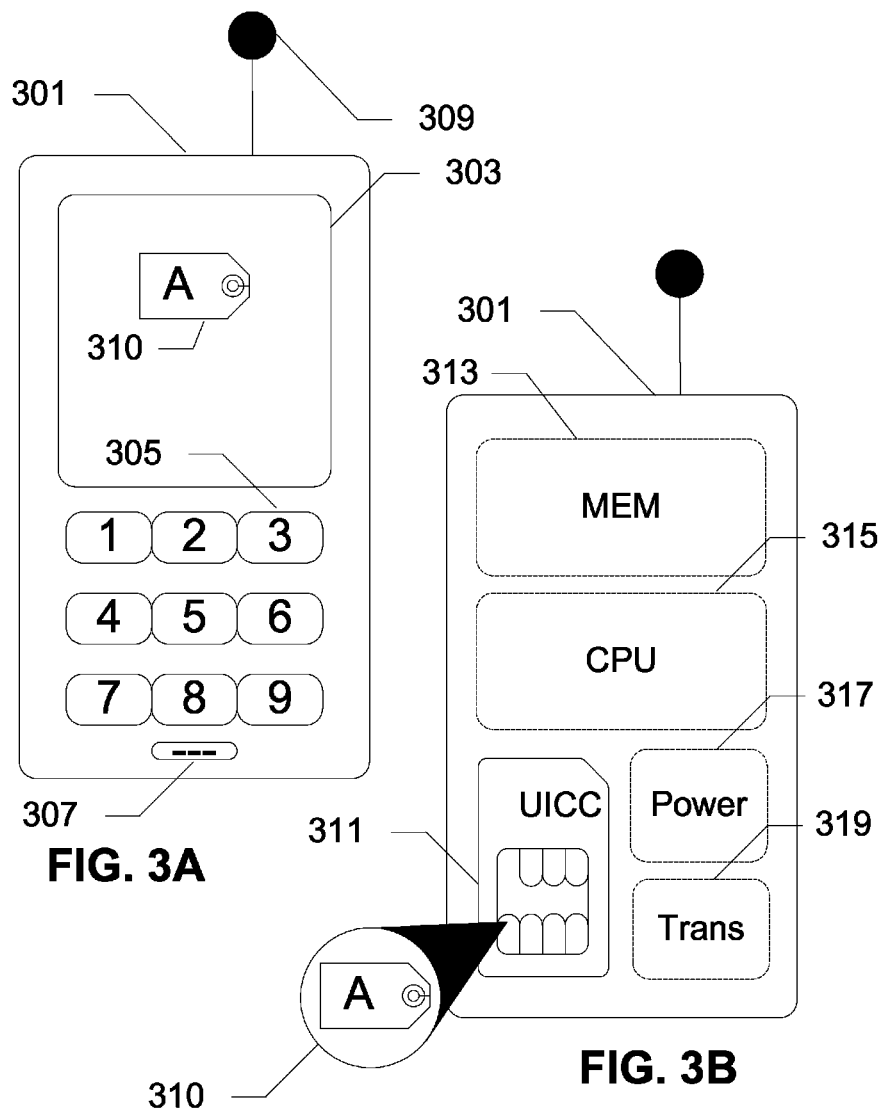
FIGS. 3A and 3B show a mobile communication device, according to an exemplary embodiment of the present invention.

FIGS. 3A and 3B show a mobile communication device 301 displaying a custom operator name 310, according to an exemplary embodiment of the present invention. In this embodiment, mobile communication device 301 includes common components of a cellular telephone such as display 303, keypad 305, microphone 307, and antenna 309. Display 303 is a Liquid Crystal Display (LCD) that serves as the visual output for the mobile communication device. Keypad 305 is a numerical keypad that serves as the physical input for user commands. The vast majority of the functions of mobile communication device 301 involve user input through keypad 305 and visual output through display 303. Microphone 307 serves as audio input for receiving a subscriber's voice for transmission across a network during a telephone call. Antenna 309 is the transmission and reception point for wireless communication of wireless communication device 301. In alternate embodiments, the display is a Light Emitting Diode (LED) screen. In further embodiments, the display is a touch-screen which may serve not only as visual output, but is capable of receiving physical input. In embodiments with a touch-screen as the display, a separate keypad as input may not be necessary FIG. 3B shows the internal components of a mobile communication device 301 having a smart card 311, according to an exemplary embodiment of the present invention. The components of mobile communication device 301 include a device memory 313, a device processor 315, a power supply 317, and a wireless transceiver 319. Device memory 313 stores an operating system and other logic for using mobile communication device 301. Memory 313 may also store applications enabling a subscriber to select or define a custom alpha tag, such as the exemplary application of FIG. 5. Memory 313 is in communication with device processor 315. Device processor 315 receives and routes data to and from the components of mobile communication device 301. Power supply 317 supplies electrical power to the components of mobile communication device 301 and also smart card 311 when it is coupled with mobile communication device 301. Transceiver 319 is in communication with device processor 315 and is responsible for communication with other communication devices across a network or communication path. This communication may be through cellular radio frequency (RF) signals, WIFI, BLUETOOTH, infrared (IR), etc.

Smart card 311 is coupled with mobile communication device 301 allowing device 301 to register with the network, and also stores authentication information, such as a unique address for the device (a phone number, MSISDN, EIN, etc.). Smart card 311 also stores a database of rules associated with operator names. An exemplary database of such rules is shown in Table 1.

TABLE 1

| Rule # | Network ID | Location | Operator Name |
|---|---|---|---|
| 1 | 310-980 | 0001-00FF | AT&T |
| 2 | 310-990 | 00FF-0FFF | AT&T Partner |
| 3 | 311-890 | FF00-FFFF | Roam |

The display rules stored on smart card 311 include at least a record identifier such as a rule number, a network ID, a location, and an operator name to be displayed on screen 303. For instance, a network ID includes a tuple of a Mobile Country Code (MCC) and a Mobile Network Code (MNC), known as an MCC/MNC tuple. These values uniquely identify the mobile network. Further, the Location field can include a location of a set of base stations that are grouped together to optimize signaling to device 301. To each location area, a unique number called a "location area code (LAC)" is assigned, and broadcast by each base station (known as a "base transceiver station" BTS in GSM, or a Node B in UMTS) at regular intervals. The LAC helps uniquely identify the sector of the network that device 301 is currently connected to. Therefore, each separate combination of Network IDs and Locations can be assigned a particular display name, which is stored in the Operator Name field of the database. The values in this field will be displayed on screen 303 depending on the current network. Thus the Operator Name can include alpha tags, PLMN Network Names (PNN), or any equivalent alphanumeric string to be displayed on screen 303. Further, programming logic within an OTA platform is able to access this database via the network, and can modify fields as per the network operator's commands. In one embodiment, programming logic modifies the Operator Name to display whatever alphanumeric string is specified by the network operator when the smart card 311 is first programmed for use. Alternatively, programming logic modifies the Operator Name to display a custom operator name, as defined by a subscriber's custom operator name request submitted to the OTA platform.

Figure 4:
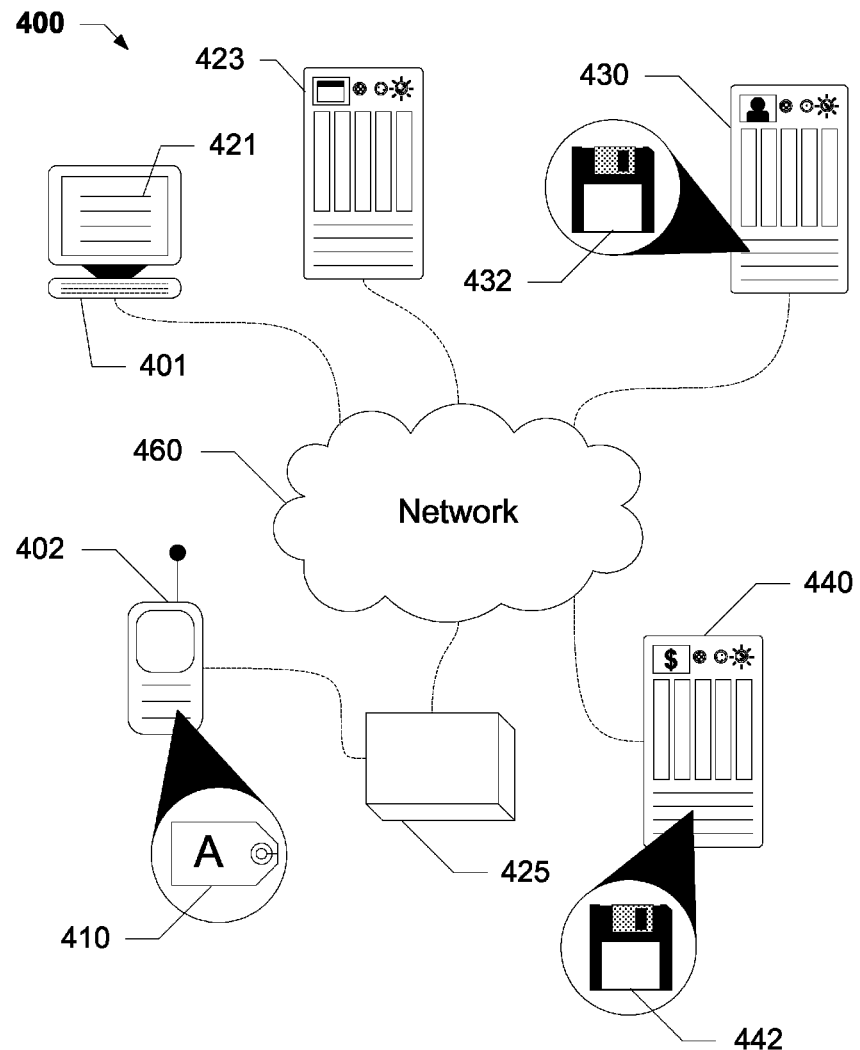
FIG. 4 shows another system for displaying a custom operator name, according to an exemplary embodiment of the present invention.

As described earlier, the device used to provision the custom alpha tag need not be the mobile communication device that will ultimately display the custom alpha tag. A subscriber or user may employ any communication device to access the application used to select and configure the additional service of customizing a network operator name. For instance, FIG. 4 shows a system 400 for managing customer defined alpha tags, according to an exemplary embodiment of the present invention. System 400 includes communications devices 401 and 402, both of which can communicate with a plurality of logic units via network 460, such as business rules logic 423, and programming logic 425, over a network. System 400 further includes an account management system 430 which includes a first subscriber account 432, and a billing system 440 which includes billing logic in communication with a second subscriber account 442.

In the present embodiment, communication device 401 is a personal computer that can access network 460 via a packet-based protocol such as TCP/IP. Network 460 may be the internet. Communication device 401 can access provisioning logic 421 via the internet 460, or via an application programmed into device 401. Interface 421 provides a means for a subscriber to update or configure services associated with the subscriber's account 432. Interface 421 further provides a means for a subscriber to customize the alpha tag 410 displayed on a screen of mobile communication device 402.

Business rules logic 423 receives requests to customize a subscriber account via network 460, and processes the requests by retrieving information from and/or updating subscriber accounts 432 and 442. Business rules logic 423 may further be in communication with a rule database configured by an operator of the network. Account management system 430 is a server or plurality of servers configured to add, remove, and modify the services provisioned to a subscriber's account 432. Account management system receives provisioning instructions from provisioning logic 421 and business rules logic 423 via network 460. Billing logic within billing system 440 receives instructions to debit or credit account 442 when a service is provisioned or removed. The method for customizing a network operator name in system 400 is similar to that described in the exemplary embodiment of FIG. 2; however, the main difference is that a user of device 401 requests a custom alpha tag to be displayed on one or more devices 402 associated with the subscriber. Consequently, when a custom operator name request is authorized by billing server 440 and is provisioned to the subscriber's account 432, programming logic 425 is invoked to enable the subscriber's other device 402 to display the custom operator name or alpha tag. This is performed over-the-air, by modifying an operator name list or corresponding PLMN list stored on a smart card within device 402, such as a SIM card or a UICC. Device 402 can now display custom alpha tag 410 on its display whenever it is connected to the specified network. This system is useful for an owner of several devices such as a corporation that provides devices 402 to several employees, but would still like to be able to provision services using personal computer 401.

Figure 5:
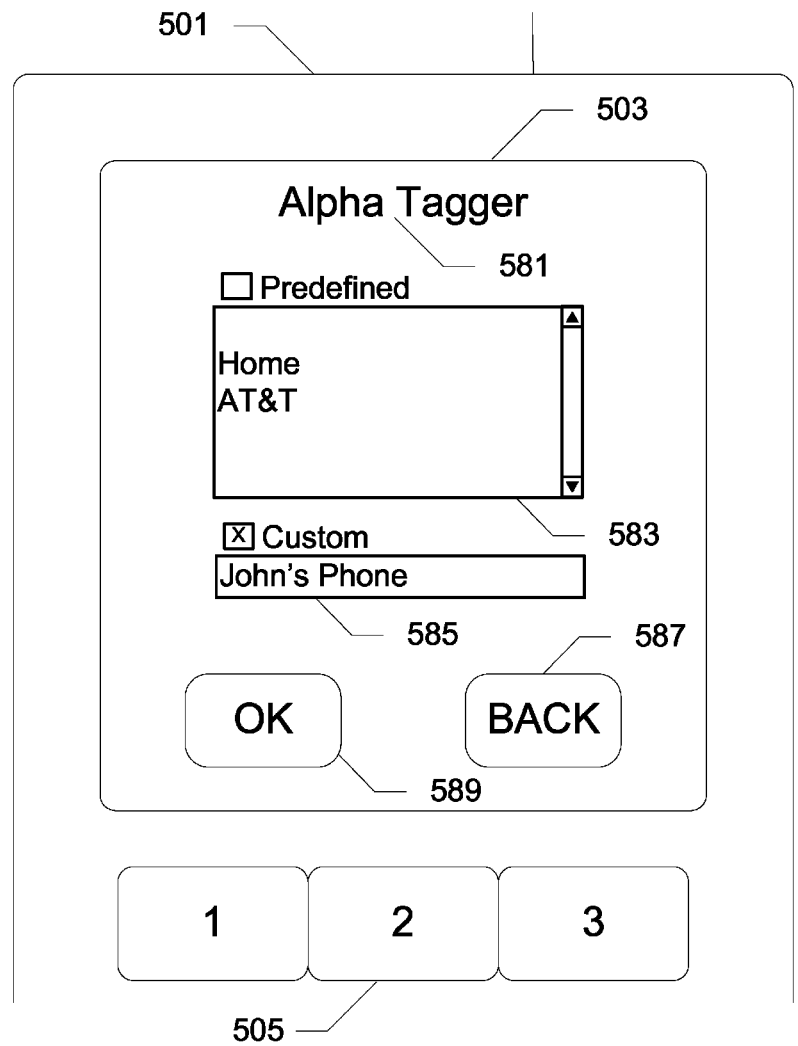
FIG. 5 shows a user interface for defining a custom operator name, according to an exemplary embodiment of the present invention.

FIG. 5 shows a user interface for customizing an operator name, according to an exemplary embodiment of the present invention. The exemplary user interface of FIG. 5 is operable on a communication device 501, which may include any device having a display 503, input 505, and a processor, memory, and transceiver (not shown). This includes mobile communication devices such as cellular telephones, as well as personal computers, laptops, terminals, etc. The user interface of FIG. 5 may be launched by an application stored on the memory within device 501. Alternatively, the user interface may be accessible via a web-based/online account management or OLAM application hosted by an application server having a provisioning logic therein. In either case, the user interface presents a user of device 501 with the ability to select a custom operator name. The interface includes a title 581, a predefined operator name selection 583, a custom operator name selection 585, and function keys 587 and 589. It will be appreciated by one skilled in the art that the user interface is in essence a form to be filled by a user or subscriber in order to provision a custom operator name to the subscriber's account. Consequently, all a user has to do is either select one from a list of predefined operator names to be displayed on a mobile communication device, or define a custom name using field 585.

As described earlier, the interface of FIG. 5 may be accessed via the mobile communication device itself, or via a separate device on a network that can communicate with the provisioning logic on the operator's network. This allows a network operator to partner with a large account holder such as a corporation and charge a fee to the corporation for providing the ability to customize an operator name. The corporation can utilize the presented mechanisms to easily identify corporate devices from personal devices, and adds security and tracking Corporate subscribers can be more creative in using custom alpha tags for marketing or promotional uses. Network operators can partner with advertisers to deliver pertinent content via alpha tags to market segments of subscribers. Further, the presented means offer individual subscribers enhanced customization of their mobile communication devices, allowing the network operator to provide more valuable services leading to greater average revenue per user (ARPU).

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system, comprising:
    a processor on a network; and
    a memory coupled to the processor, the memory storing instructions that, when executed by the processor, causes the processor to perform operations comprising:
        providing a user interface to a communication device of a user, the user interface enabling selecting a predefined operator name and receiving an input of a custom operator name,
        receiving a custom operator name request from the communication device, the custom operator name request comprising the custom operator name generated at the user interface,
        determining whether to charge the user for the custom operator name request,
        determining whether the custom operator name request conflicts with an existing business rule,
        in response to determining that the custom operator name request does not conflict with the existing business rule, updating a public land mobile network list with the custom operator name, the public land mobile network list being stored in a first subscriber account associated with the user, and
        transmitting the custom operator name to a mobile communication device on the network, wherein the custom operator name is displayed on a display of the mobile communication device.

2. The system of claim 1, further comprising a smart card configured to be removably coupled to the mobile communication device, the smart card comprising a database for storing a plurality of rules associated with a plurality of operator names.

3. The system of claim 2, wherein the plurality of rules is on the public land mobile network list.

4. The system of claim 2, wherein the operations further comprise transmitting the custom operator name to the mobile communication device by updating the database with the custom operator name.

5. The system of claim 1, wherein the custom operator name request further comprises metadata comprising a unique subscriber ID associated with the user.

6. The system of claim 1, wherein the communication device is a personal computer.

7. The system of claim 1, wherein the operations further comprise in response to determining to charge the user for the custom operator name request, charging a second subscriber account associated with the user.

8. The system of claim 1, wherein the user interface provides a plurality of predefined operator names to choose from.

9. The system of claim 8, wherein the user interface is provided by a client application on the communication device.

10. The system of claim 8, wherein the user interface is provided via the network.

11. The system of claim 1, wherein the first subscriber account comprises a plurality of unique device IDs, wherein each unique device ID of the plurality of unique device IDs corresponds to one of a plurality of mobile communication devices associated with the user.

12. The system of claim 11, wherein the operations further comprise transmitting the custom operator name to the plurality of mobile communication devices.

13. A method comprising:
    providing, by a server comprising a processor, a user interface to a communication device of a user, the user interface enabling selecting a predefined operator name and receiving an input of a custom operator name;
    receiving, by the processor, a custom operator name request from the communication device across a network, the custom operator name request comprising the custom operator name generated at the user interface;
    determining, by the processor, whether to charge the user for the custom operator name request;
    determining, by the processor, whether the custom operator name request conflicts with an existing business rule;
    in response to determining that the custom operator name request does not conflict with the existing business rule, provisioning, by the processor, a public land mobile network list stored in a first subscriber account with the custom operator name, the first subscriber account associated with a unique subscriber ID associated with the user; and
    transmitting, by the processor, the custom operator name to a mobile communication device on the network, the mobile communication device being associated with the first subscriber account and having a smart card storing a database, the database comprising a plurality of rules associated with a plurality of operator names.

14. The method of claim 13, wherein the database on the smart card is for storing the public land mobile network list.

15. The method of claim 13, further comprising updating a plurality of databases on a corresponding plurality of mobile devices associated with the first subscriber account.

16. The method of claim 13, further comprising in response to determining to charge the user for the custom operator name request, charging a second subscriber account associated with the unique subscriber ID.

17. The method of claim 13, wherein the custom operator name request is generated at a client application on a memory on the communication device.

18. The method of claim 17, wherein the client application presents a plurality of predefined operator names.

19. A server comprising:
   a processor; and
   a memory storing instructions that, when executed by the processor, cause the processor to perform operations comprising:
      providing a user interface to a communication device of a user, the user interface enabling selecting a predefined operator name and receiving an input of a custom operator name,
      receiving a custom operator name request from the communication device, the custom operator name request comprising the custom operator name generated at the user interface,
      determining whether the custom operator name request conflicts with an existing business rule,
      in response to determining that the custom operator name request does not conflict with the existing business rule, updating a public land mobile network list with the custom operator name, the public land mobile network list being stored in a first subscriber account associated with the user,
      determining whether to charge the user for the custom operator name request,
      in response to determining to charge the user for the custom operator name request, charging a second subscriber account associated with the user, and
      transmitting the custom operator name to a mobile communication device, wherein the custom operator name is displayed on a screen of the mobile communication device when the mobile communication device is connected to a specified network.

20. The server of claim 19, wherein the custom operator name is an enhanced operator name string.

* * * * *